US006565728B1

(12) United States Patent
Kozulic

(10) Patent No.: US 6,565,728 B1
(45) Date of Patent: May 20, 2003

(54) GEL CUTTING AND RECOVERING DEVICE

(75) Inventor: Branko Kozulic, Zurich (CH)

(73) Assignee: Elchrom Scientific, Cham (CH)

( * ) Notice: Subject to any disclaimer, the term of this patent is extended or adjusted under 35 U.S.C. 154(b) by 102 days.

(21) Appl. No.: 09/589,081

(22) Filed: Jun. 8, 2000

(51) Int. Cl.[7] ........................... C02F 1/40; C02F 11/00; C25B 11/00; C25B 13/00; C25B 9/00; G01N 27/27; G01N 27/403; G01N 27/453

(52) U.S. Cl. ......................... 204/606; 422/99; 422/100; 435/309.1; 73/864.44; 73/864.45; 204/613; 204/606

(58) Field of Search ................ 422/99, 100; 435/309.1; 73/864.44, 864.45, 864.01, 864.11, 864.13, 864.14, 864.16, 864.17, 864.18, 864.91; 204/613, 606

(56) References Cited

U.S. PATENT DOCUMENTS

| | | | | | |
|---|---|---|---|---|---|
| 2,463,455 | A | | 3/1949 | Dann | |
| 3,734,358 | A | * | 5/1973 | Bergeron | 222/326 |
| 3,949,471 | A | | 4/1976 | Cawley | |
| 4,010,543 | A | | 3/1977 | Nusbaum | |
| 4,341,735 | A | * | 7/1982 | Seifried | 422/66 |
| 4,696,298 | A | * | 9/1987 | Higgins et al. | 604/22 |
| 5,217,591 | A | * | 6/1993 | Gombocz et al. | 204/466 |
| 5,272,926 | A | * | 12/1993 | Wilkins | 73/864.13 |
| 5,460,782 | A | * | 10/1995 | Coleman et al. | 422/100 |
| 5,527,680 | A | * | 6/1996 | Tran et al. | 204/462 |
| 5,550,033 | A | * | 8/1996 | Krumdieck | 422/102 |
| 5,587,062 | A | * | 12/1996 | Togawa et al. | 204/456 |
| 5,638,170 | A | * | 6/1997 | Trinka et al. | 356/244 |
| 5,766,436 | A | * | 6/1998 | Alam | 204/456 |
| 5,770,158 | A | * | 6/1998 | Eischen et al. | 422/100 |
| 6,035,750 | A | | 3/2000 | Hansen | |
| 6,342,143 | B1 | * | 1/2002 | Minden | 204/262 |

* cited by examiner

*Primary Examiner*—Jill Warden
*Assistant Examiner*—Jennine Brown
(74) *Attorney, Agent, or Firm*—Lowe Hauptman Gilman & Berner, LLP

(57) ABSTRACT

The device of present invention is used for cutting and recovery of a selected gel piece from a larger gel mass. The gel piece suitably contains molecules that will be used in further work. The preferred device is made up of at least two parts: a hollow member with a distal end terminating in a cutting edge, a proximal end, and a lumen in between the proximal and distal ends; and a piston member. The lumen part of the hollow member close to the proximal end has a larger cross section than a lumen part close to the distal end. The piston body has at least a first body that fits snugly in the lumen part having the larger cross section and a second body is longer than length of the lumen part with a smaller cross section and fits within the smaller cross section portion of the hollow tube, creates reduced pressure when moved towards proximal end of the hollow tube is disposed within the lumen. After cutting a selected portion of the gel mass with the cutting end of the hollow member, and thereby forcing a cut portion of the gel mass into the smaller cross section portion of the lumen, movement of the piston away from the cutting edge reduces the pressure in the smaller cross section of the lumen and this serves to keep the cut gel piece in lumen of the hollow member. The cut gel can then be ejected by reversing the movement of the piston. In a preferred embodiment, the cut gel portion can be recovered.

17 Claims, 8 Drawing Sheets

GEL CUTTING AND RECOVERING DEVICE

BACKGROUND OF THE INVENTION

This invention relates to a device for cutting a selected part of a gel. Suitably, the gel may contain molecules, other than the gel molecules. Suitably, the gel may have been subjected to an electric field in an electrophoresis apparatus. Typical molecules include biological macromolecules, such as nucleic acids and proteins. The device of the invention is also adapted to eject the cut gel portion from the device. The molecules present inside the cut gel can be used in further work.

When a selected part of a gel is excised from the whole, a hole remains in the gel. Various hole producing devices are known in prior art, including those that are suitable for making holes in a gel. U.S. Pat. No. 2,463,455 to Dann describes a device that is able to make holes in agar gel in a circular pattern. U.S. Pat. No. 3,949,471 to Cawley discloses a device suitable for making wells or cavities in a gel. The gel material that has been cut is known to be removed by applying a vacuum, created by an external means, to the outer portion of the cutter. Once the cutting has been completed, the cut gel material can be discarded. U.S. Pat. No. 4,010,543 to Nusbaum teaches that holes can be made in a tacky material by using a hollow tube with a knob coupled to the top of the tube to form a handle. A hole in the knob vents the inside of the tube and therefore prevents formation of vacuum, and easy removal of the cut piece from the tube is facilitated. U.S. Pat. No. 6,035,750 to Hansen discloses a hole cutter with a vacuum slug removal means. Vacuum applied to the proximal end of the tube moves slugs away from the distal cutting end and through lumen of the tube. The removed slugs are then ejected at the proximal end of the hollow tube. The device of Hansen can be used as part of a medical catheter.

In U.S. Pat. No. 5,587,062 Togawa et al. a robotic apparatus for sample collecting from electrophoresis gels is disclosed. The apparatus contains a detector for optical detection of separated bands, a mechanism that moves a cutting tool, and a controlling device that directs cutting of a specific gel piece. The cutting tool allows packing of several cut gel pieces inside lumen of the cutting tool. A discharge mechanism, situated above the cutting tool, provides compressed air for ejection of the slug(s). Gel slug(s) packed inside the cutting tool is discharged into a container by means of compressed air that is supplied from the discharge mechanism.

Togawa et al. do not disclose which forces keep the cut gel inside the lumen of the cutting tool. It appears that the gel slugs remain inside the tube through frictional engagement with interior surface of the cutting tool. The strength of such frictional engagement depends on the properties of the gel material as well as on the properties of the inner surface of the cutting tool. Several different gel materials are currently in use for separating proteins and nucleic acids by gel electrophoresis. The most common ones are agarose and polyacrylamide. Reference is also made to several novel gels, including Poly(NAT) (U.S. Pat. No. 5,319,046), Clearose™ (U.S. Pat. No. 5,541,255) and Spreadex™ (U.S. Pat. No. 5,840,877. The above mentioned gel materials differ not only in their ability to separate nucleic acids and proteins, but also in their hardness and elasticity.

It has been found that cutting a piece out of each one of these gels can be done using a scalpel or a 0.2 mm thin nylon string. These tools, however, produce gel pieces of various sizes. As the gel volume varies, and since typical electrophoresis gels contain at least about 90% of water, this can create problems in subsequent steps, which may include, among others, incubation of a cut gel piece in a solution containing reagents of defined concentration. The concentration of these reagents then varies as the reagents are diluted with gel water to difference extents depending on the volume of gel that is excised. Furthermore, some practicing is needed to attain the skill necessary for handling the scalpel or the nylon string for this use.

Gel cutting can be also done using an ordinary pipette tip whose opening has been enlarged and sharpened prior to its use as a cutting tool. There is little variation in cut gel volume when using such a tip. The inner surface of the tip can be made rough by scratching it with a sharp metal, for example with the tip of forceps. The rough surface increases frictional engagement of the cut gel with the inner surface of the tip. In most cases, this improvised device worked well for cutting and recovery of a piece of Spreadexrm gel. That is, the cut gel piece remained inside the tip of the pipette after the tip was removed from the gel. However, this improvised device did not work with Clearose BG™ gels. These gels are more elastic than Spreadexm gels and are substantially non-tacky. After lifting the tip out of the gel, the cut gel piece did not remain in lumen of the tip. Instead, it remained in its previous position in proximate association to the gel, even though it was completely cut from the surrounding gel. Evidently, frictional engagement between the cut gel and the tube surface was not sufficient to keep the cut gel in the lumen of the pipette. A device that overcomes the above described problems, as well as some other deficiencies of the devices known in prior art, is very desirable.

OBJECTS AND SUMMARY OF THE INVENTION

It is accordingly an object of the present invention to provide a novel gel cutting and recovery device that is suitable for cutting all gel materials.

It is an object of the present invention to provide an improved means of holding a cut gel piece inside a gel cutting device for its removal from association with the gel body.

It is a further object of the present invention to provide, in a single device, a means for creating reduced pressure sufficient to hold a piece of cut gel in the device, and a means for ejecting the cut gel.

Still a further object of the present invention is provision of a disposable device useful for cutting and recovery of a gel piece, containing proteins or nucleic acids, that have been separated by gel electrophoresis.

These and other objects, features and advantages will be explained, and will, in part, become clear from the following description in conjunction with the accompanying drawings.

In accord with an fulfilling these objects, the instant invention constitutes a novel device for cutting a portion of a gel; removing the cut portion of the gel from association with the gel body and enabling delivery of the cut gel portion from the device for further work on the cut gel portion. This device comprises a hollow first body and a piston second body at least partially disposed within and in longitudinally movable relationship to the hollow body. The hollow body has distal and a proximal ends, respectively. The distal end terminates in a cutting edge that at least substantially surrounds a smaller cross section hollow portion of the first body. The proximal end of the first body has a larger cross section hollow portion. A lumen connects the smaller and larger cross section hollow volumes. A first portion of the piston, that is proximate to the proximal end of the hollow first body, is so shaped and sized as to fit snugly in the lumen. A second portion of the piston has a cross section that is smaller than the cross section of the smaller cross section portion of the first body and is thereby adapted to longitudinally move freely within the smaller cross section portion of the first body. The second portion of the piston is longer than the length of the first portion of the hollow body. The snugness of the fit between the larger cross section portion of the piston and the second portion of the first, hollow, body is such that longitudinal movement of the piston body in relation to the hollow body will create a reduced or increased pressure, respectively, in the first hollow portion when the device is in cutting contact with gel material.

BRIEF DESCRIPTION OF THE DRAWINGS

The accompanying drawings illustrate embodiments of the invention and together with the specification serve to illustrate principles of the invention.

DETAILED DESCRIPTION OF PREFERRED EMBODIMENTS

Figure 1:
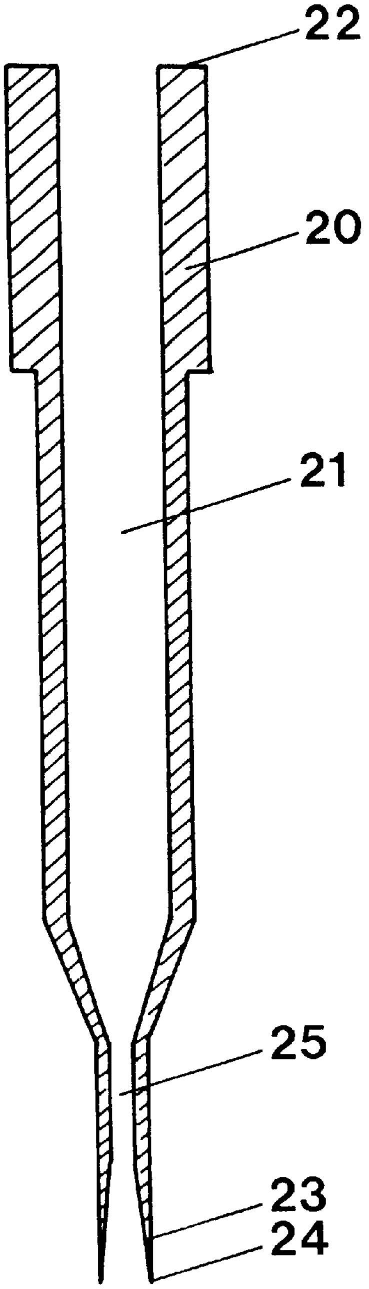
FIG. 1 is a cross section of a hollow tube with cutting edge.
Figure 2:
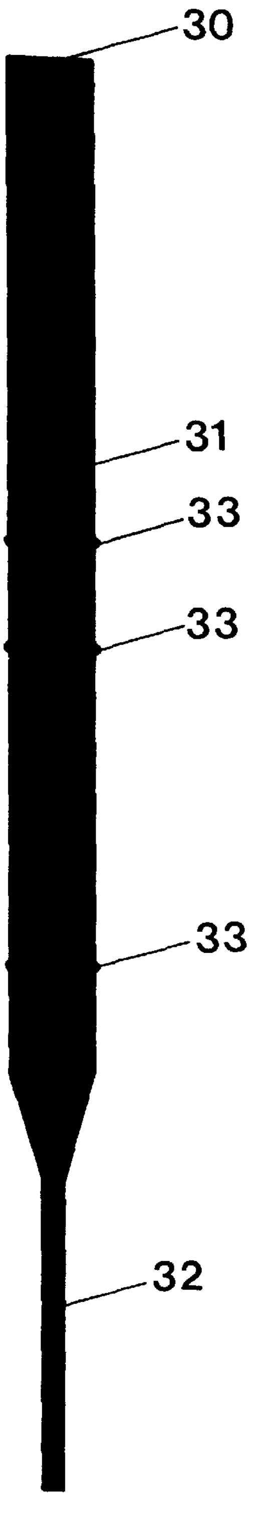
FIG. 2 schematically shows a piston with first and second body and rings.

The device of present invention is preferably made up of at least two interactive bodies, as shown in FIG. 1 and FIG. 2. The first body is a hollow tube 20 having a proximal end 22 and a distal end 23. The first body has a lumen 21 that is of a larger cross section at its proximal end 22 than at its distal end 23. The distal end 23 terminates with a cutting edge 24. The second body comprises a piston 30 that has a first section 31 and a second section 32. The first, or proximal section 31 has a larger cross section than the second, or distal section 32 of the piston.

Figure 3:
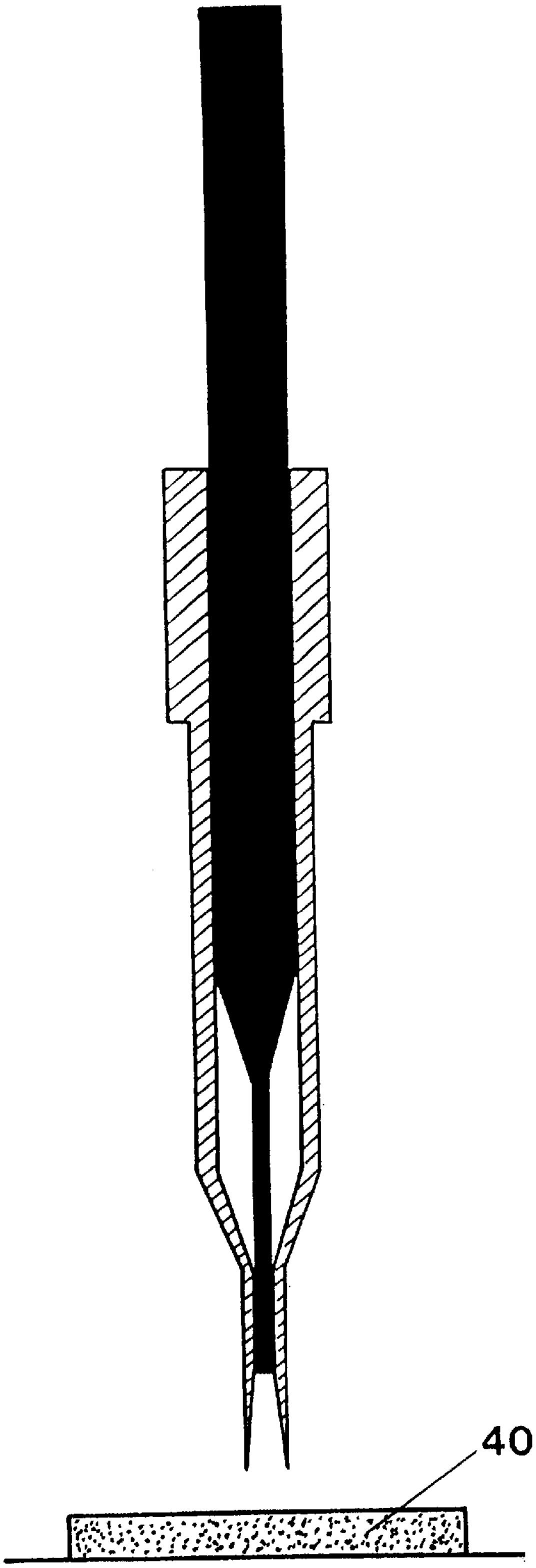
FIG. 3 shows position of the piston of cutting device prior to gel cutting.
Figure 5:
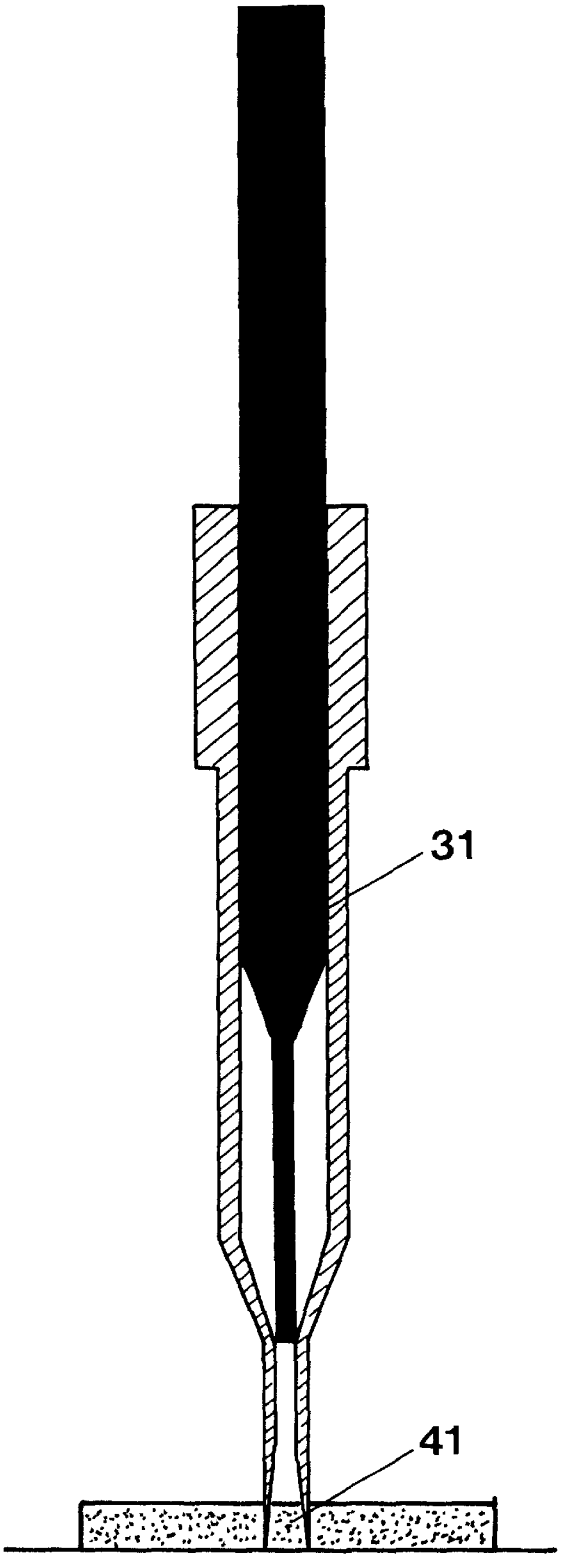
FIG. 5 shows position of the piston prior to removal of the cutting device from the gel, FIG. 6. shows position of the piston when the cut gel piece is in the lumen of the device, FIG. 7. shows position of the piston after ejection of the cut gel, and FIG. 8. is an example of another shape of the cutting edge and of the lumen at the distal end of the hollow tube.
Figure 6:
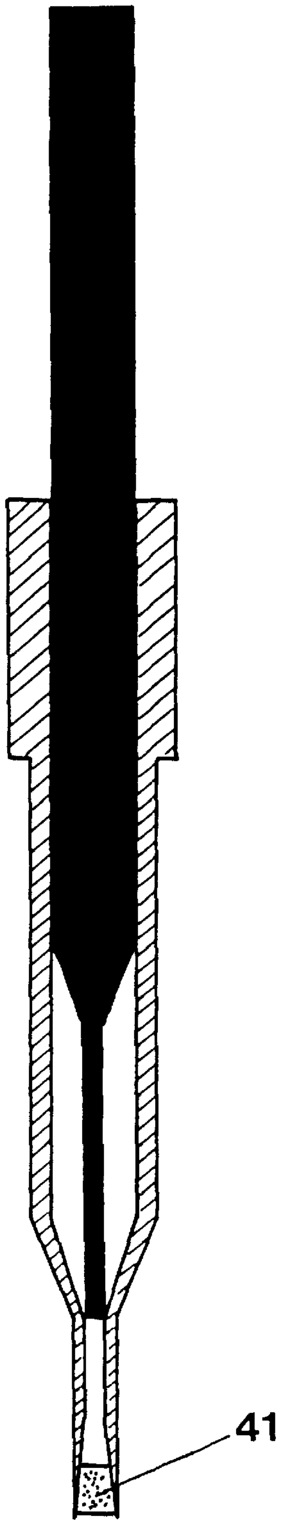
Figure 7:
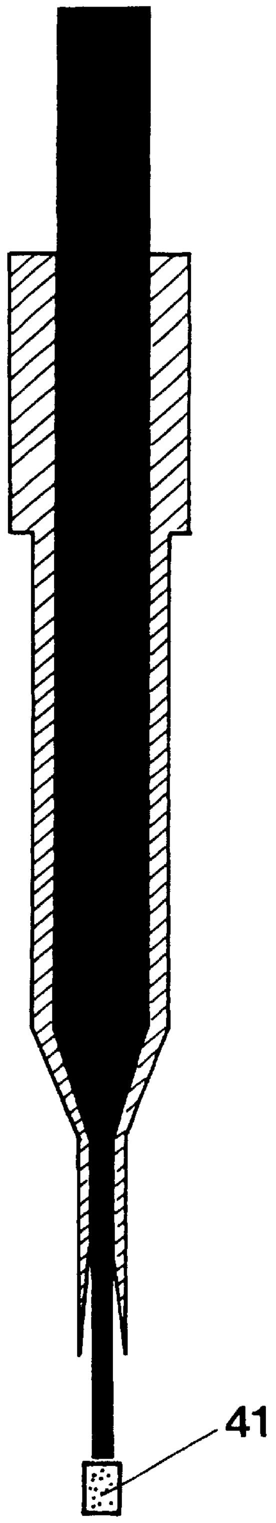

FIG. 3 shows position of the piston 30 inside the hollow tube 20 prior to cutting of a portion of a gel 40. The position of the second section 32 of the piston in the hollow tube is such that it does not impede the entry of a cut piece of gel into the smaller cross section of the lumen of the hollow tube. The gel is cut by pressing the cutting edge 24 against gel surface and into the gel for such a distance as is required to cut the desired amount of gel. The piston suitably remains in a fixed position (see FIG. 4) relative to the hollow tube during this cutting operation. After cutting is completed to the desired depth, the piston is caused to move towards proximal end of the hollow tube, as shown in FIG. 5. This movement of the piston creates a reduced pressure in the lumen of the tube between the cut gel piece 41 and first body of the piston 31. The reduced pressure serves to hold the cut gel inside the lumen during and after its removal from the main gel body. FIG. 6 shows the device of this invention with the cut gel piece 41 inside. The cut gel piece 41 can then be ejected from the lumen, suitably into a container (not shown) by movement of the piston towards distal end of the hollow tube, as shown in FIG. 7 With the present device, it was possible to cut and recover pieces of all tested gels, including Clearose BG™ gels.

An important feature of the present device is the means to create and maintain reduced pressure in the smaller cross section portion of the lumen of the hollow tube. The reduced pressure (vacuum) is formed because the first section 31 of the piston fits snugly in the larger cross section area of the lumen 21 of the hollow tube (FIG. 1 and 2). The fit between the outside surfaces of the larger cross section area of the piston and the inner surface of the larger cross sectional area of this portion of the hollow tube must be sufficient to create and maintain a pressure differential between area within the smaller cross section portion of the hollow tube and the ambient atmosphere, preferably the fit should be air tight. One important feature of the device of the instant invention is that not all of the piston body is engaged in a tight fit with all of the hollow body. If the whole first body of the piston fits snugly in the lumen, frictional resistance to movement of the piston can be rather high, requiring application of significant force to move the piston.

A preferred aspect of this invention provides rings 33 on the piston in close relationship to the inside wall of the lumen. When the tight fit is achieved only through rings 33 of the piston (FIG. 2), less force is needed for moving the piston. Other ways of forming an air tight fit will be apparent to those skilled in the art. For example, a rubber ring can be placed on the piston 30. Alternatively, the piston, or the hollow tube, when made of a plastic material, can contain thin sections that can be deformed to establish a tight fit. To improve the fit, while at the same time reducing the force needed for movement of the piston, a lubricant can be applied on the piston and/or inner surface of the hollow tube. Suitable lubricants are, for example, water, oil or glycerol In the prior art, the devices that use vacuum, for example those disclosed in U.S. Pat. Nos. 6,035,750 and 3,949,471 rely on an external vacuum source. In contrast, the ability to create vacuum, wholly by movement of the two bodies of the instant device, within the instant device is a key property of the device of present invention. Although this invention relies on the ability of the instant device to provide the necessary vacuum or pressure to accomplish its desired use, it is within the scope of this invention to provide auxiliary external vacuum and/or pressure producing means.

In the device of present invention, the fit between the second body 32 of the piston and inner surface of the smaller hollow tube in the area 25, where the lumen 21 has a small cross section, is not air tight. The cross section of the second body 32 is such that some free space is left between the piston and the inner surface of the hollow tube. This free space allows creation of reduced pressure between the cut gel and first body of the piston 31. It is preferred that this space is too small to prevent passage of the cut gel there through.

Figure 4:
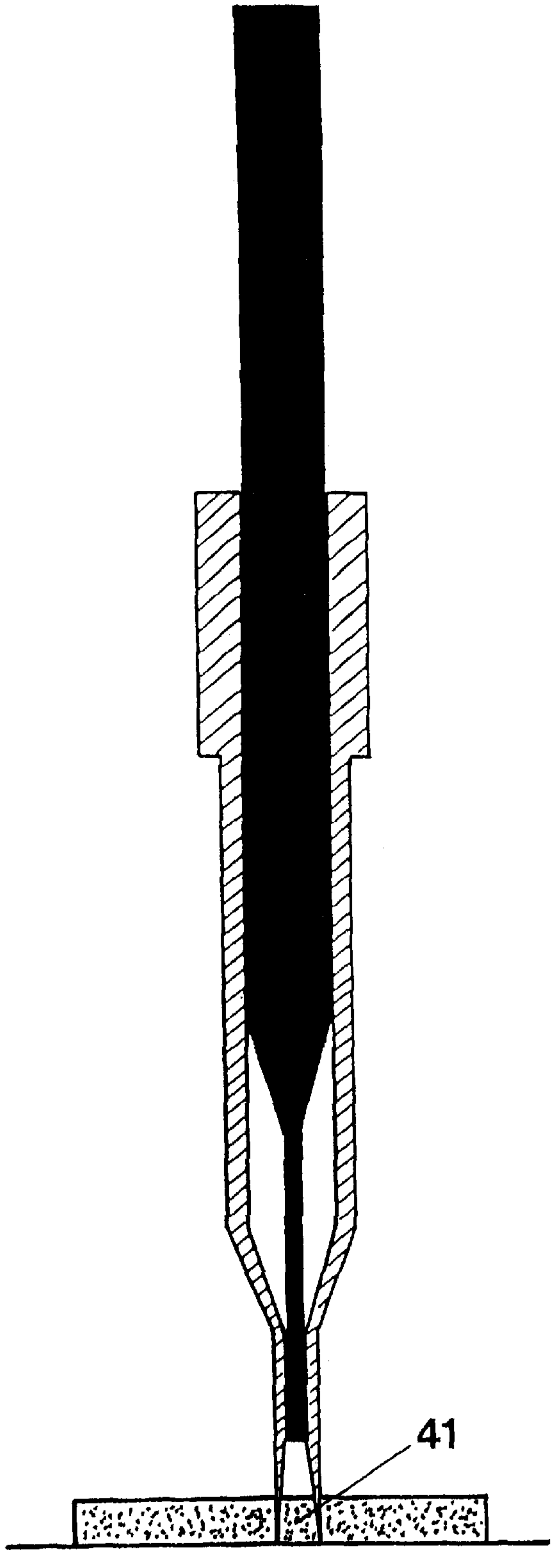
FIG. 4 displays position of the piston during gel cutting.

As shown in FIG. 4, it is a preferred embodiment of this invention that the cross section of the lumen part 25 (FIG. 1) gradually decreases from the cutting edge towards proximal end, before it becomes constant and widens again. In this manner, the cut gel piece that has been taken up into the small cross section lumen is compressed inside the lumen at its distal end. This gel compression serves to increase the frictional engagement between the cut gel portion and inner surface of the small cross section portion of the hollow tube. Accordingly, the cut gel is kept in place by two means, by reduced pressure and by frictional engagement. The frictional engagement can be further increased by making the surface rough. It should be noted, however, that the feature of gel compression is not essential for the device of present invention.

Figure 8:
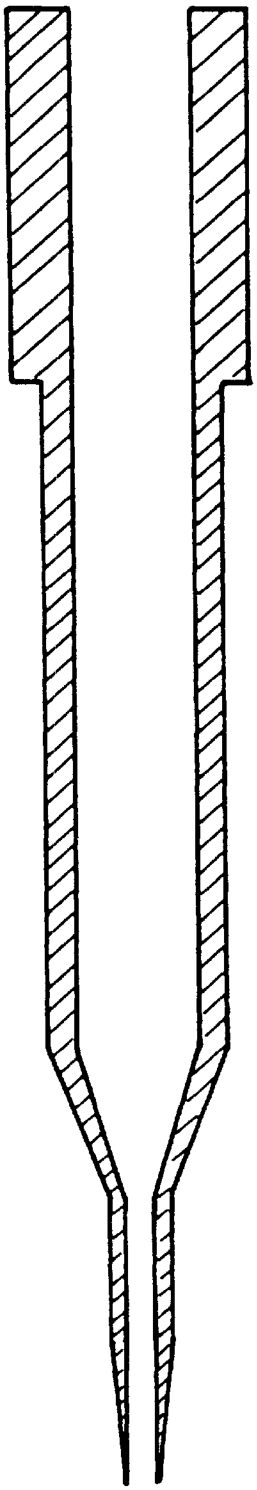

Thus, it is possible to construct a hollow tube with a different design, one such is shown in FIG. 8. A gel piece cut with this device is not compressed in the hollow tube. It is kept there mostly by reduced pressure formed by movement of the piston, as described above.

When the piston 30 is moved toward the proximal end of the tube to form a vacuum in the smaller cross section portion of the hollow member, it is preferred to stop its motion before the end of second body 32 of the piston passes into the part of lumen having a large cross section. (see FIG. 5) If the piston is moved beyond this point, and if a gel is of such a nature that it can be easily additionally compressed, then the reduced pressure may cause the cut gel to be sucked into wider portion of the lumen 21. That is undesirable because subsequent ejection would be difficult. To facilitate moving of the piston just to the right position, the piston can have a ring which "locks" into a constriction at the proximal end of the tube. An alternative is to separate the vacuum creating part of the piston (first body 31) from the ejection part of the piston (second body 32). The ejection part could stay immobile, while the reduced pressure is created, at a place where the cut gel could not pass through any free space near the ejection part. Such a device will then consist of three pieces, like the device in which air tight sealing between the piston and inner surface of the hollow tube is achieved by adding a rubber ring to the piston.

The device of present invention is preferable made of a plastic material. The preferred manufacturing method is injection molding. But other materials and production methods can be used as well. For example, the device can be made of metal or glass. It is possible to make the hollow tube of one material while the piston is made of another material. The color of the several elements of the device of this invention can be the same or different. It is possible that one element of the device can be substantially transparent while the other is colored and opaque. For example, the hollow tube can be substantially transparent while the piston can be black. Suitable plastic materials include polyethylene, polypropylene, polycarbonate, polystyrene, synthetic rubber and others. The piston can be made of a material that is softer than the hollow tube, or the hollow tube can be produced from a softer material. The hollow tube can be made thin, at least in one part, so that its cross section changes from the distal toward the proximal ends.

An important requirement is that an air tight seal is formed between the larger cross section of the hollow tube and its associated piston portion. The hollow tube and the piston are necessarily of complementary shapes. The cross sections are preferable of a round shape, but other shapes, for example oval, are possible. The preferred shape of the cutting edge is round, but other shapes are suitable as well, for example square or rectangular. U.S. Pat. No. 4,391,042 to Sunderland describes a cutter for cutting a non-circular opening.

In the practice of using the present device for gel cutting and recovery, the device is held by the operator in one hand. The gel usually rests on a light table or a bench. Turning the device clockwise-counter clockwise, one or more times, while keeping it vertical, may help to achieve complete cutting of the gel. It is preferred that the other hand is used to pull the piston up, whereafter the cutting device is lifted away from the main gel body, and the piston can then be pushed to eject the gel. It is possible to fit and shape the hollow member and the piston member so as to enable one handed operation. It is important to note that the use of the device of present invention is not limited to the described manual mode of operation. The device can be a part of a mechanical instrument able to perform the operations which are necessary for cutting and recovering of the gel.

The excised gel piece, containing molecules of interest, can be used in various applications. Most of the applications are analytical, but other applications are also known. For example, DNA or protein molecules present in the gel piece can be eluted and then used for further analysis. The elution can be accomplished by diffusion or by electrophoresis. Further analysis can mean determining the sequence of the protein or the DNA. In the alternative it can mean cleavage by a selected enzyme, or mixtures of enzymes, which may include proteases or restriction enzymes. A DNA fragment from the cut gel piece can be amplified, either in its full length or just in part. Another use of recovered DNA is cloning. A protein present in the gel can be used for production of antibodies. Other applications are known to those skilled in the art.

One advantage of the device of present invention is in that it can disposable, and therefore adapted to a single use. This advantage is of particular importance when performing DNA amplification. When the same cutting tool is used for cutting several gel pieces, there is a possibility of cross-contamination. The use of a disposable device avoids this problem. Another advantage of present device is the use of a piston to disptace the cut gel into a container for further work. In contrast, Togawa et al. in U.S. Pat. No. 5,587,062 use externally supplied compressed air for ejecting the cut gel piece. An aerosol is created when a wet gel piece is ejected by compressed air, and this aerosol may contain the molecules of interest. Aerosols are known to cause problems in DNA applications which require subsequent amplification of recovered DNA.

The preset device can be of different dimensions. For analytical applications, it is important that the band, or spot, of interest is excised with a high precision. Therefore, the cross section of the hollow tube at the cutting edge needs to be as small as possible for recovery of sufficient gel material. When the cutting edge is of round shape, then the diameter suitable for analytical applications is from 0.5 to 4 mm, preferably from 1-3 mm. A larger cross section may be better suited for preparative applications.

While present invention has been described in considerable detail, it will be apparent to those skilled in the art that modifications and changes, some of which are referred to above, may be made in the procedure or device itself without departing from the concept and scope of the invention as described in the following claims.

What is claimed is:

1. A gel cutting and recovering device, comprising:

a hollow first body having a distal end terminating in a cutting edge, a proximal end, and a lumen extending between said distal and proximal ends, wherein said lumen is of a smaller cross section at least proximate to said distal end a larger cross section at least proximate to said proximal end; and a piston comprising a first portion that fits snugly in a larger cross section portion of said lumen spaced from said distal end, and a second portion having a smaller cross section than the cross section of said smaller cross section portion of said first body proximate to the distal end of the hollow tube and adapted to move freely within said distal end;

wherein said second portion of the piston is longer than the length of the lumen part that has a smaller cross section, and wherein movement of said piston away from said distal end is adapted to aid in retaining cut gel in said smaller cross section portion of said lumen, and movement of said piston toward said distal end is adapted to eject a cut gel piece from said lumen;

where, during ejection, said distal end of said piston is adapted to contact the cut gel piece being ejected

2. A device of claim 1 wherein at least one element of said device is made of a plastic material.

3. A device of claim 2, wherein the hollow tube and the piston are of the same material.

4. A device of claim 2, wherein the hollow tube and the piston are of different materials.

5. A device of claim 1, further comprising means adapted to permit movement of the piston relative to said hollow tube by hands of an operator.

6. A device of claim 1, further comprising means adapted to permit movement of the piston relative to said hollow tube by an instrument.

7. A device of claim 1, wherein said smaller cross section portion of said hollow member tapers from said distal end widening toward said proximal end.

8. A device of claim 1 wherein said larger cross section portion of said hollow member is of greater cross section than the portion of said piston proximate thereto, and further comprising at least one ring disposed between inside walls of said larger cross section portion of said hollow member and outside walls of said proximate piston.

9. A device of claim 8 wherein said ring is resilient and produces an air tight relationship between said tube and said piston.

10. A device of claim 8 comprising a plurality of said rings.

11. A device as claimed in claim 1 wherein said cross sections are substantially circular.

12. A device of claim 1 wherein said cutting edge comprises a taper in said distal end of said hollow member.

13. A device of claim 12 wherein said taper is from the inside of said smaller cross section portion of said hollow member toward the outside of the distal end of said hollow member.

14. A process of cutting and recovering a piece of a main gel mass comprising:

disposing a distal end of a device as a claimed in claim 1 onto said main gel mass;

while maintaining said piston and hollow member in substantially static relationship to each other, inserting said distal end into said main gel mass, whereby cutting a portion of said gel mass;

moving said piston away from said distal end of said hollow member a distance sufficient to create a vacuum between said piston and said distal end but insufficient to cause the distal end of said piston to proceed from said smaller cross section portion of said hollow member into said larger cross section portion of said hollow member, whereby sucking said cut gel piece into said smaller cross section portion of said hollow member; and removing said device from contact with said gel mass while maintaining said cut gel portion within said lumen.

15. A process of claim 14, wherein said gel mass contains at least one macromlecule.

16. A process of claim 7, wherein the macromolecule comprises a protein.

17. A process of claim 7, wherein the macromolecule comprises a nucleic acid

* * * * *